(12) United States Patent
Vanka et al.

(10) Patent No.: US 9,678,809 B2
(45) Date of Patent: *Jun. 13, 2017

(54) SYSTEM AND METHOD FOR PROVIDING DYNAMIC CLOCK AND VOLTAGE SCALING (DCVS) AWARE INTERPROCESSOR COMMUNICATION

(71) Applicant: QUALCOMM INCORPORATED, San Diego, CA (US)

(72) Inventors: Krishna Vsssr Vanka, Hyderabad (IN); Shirish Kumar Agarwal, Hyderabad (IN); Sravan Kumar Ambapuram, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/993,991

(22) Filed: Jan. 12, 2016

(65) Prior Publication Data

US 2016/0124778 A1 May 5, 2016

Related U.S. Application Data

(63) Continuation of application No. 14/210,064, filed on Mar. 13, 2014, now Pat. No. 9,244,747.

(51) Int. Cl.
*G06F 9/54* (2006.01)
*G06F 1/32* (2006.01)

(52) U.S. Cl.
CPC .............. *G06F 9/54* (2013.01); *G06F 1/324* (2013.01); *G06F 9/544* (2013.01)

(58) Field of Classification Search
CPC ............. G06F 9/54; G06F 9/544; G06F 1/324
See application file for complete search history.

(56) References Cited

U.S. PATENT DOCUMENTS

| | | | |
|---|---|---|---|
| 7,321,942 B2 | 1/2008 | Flautner et al. |
| 8,347,129 B2 | 1/2013 | Paik |
| 8,533,505 B2 | 9/2013 | Greenhalgh |

(Continued)

OTHER PUBLICATIONS

International Search Report and Written Opinion—PCT/US2015/020195—ISA/EPO—Jun. 18, 2015.

(Continued)

*Primary Examiner* — Charles E Anya
(74) *Attorney, Agent, or Firm* — Smith Tempel Blaha LLC

(57) ABSTRACT

Systems and methods that allow for Dynamic Clock and Voltage Scaling (DCVS) aware interprocessor communications among processors such as those used in or with a portable computing device ("PCD") are presented. During operation of the PCD at least one data packet is received at a first processing component. Additionally, the first processing component also receives workload information about a second processing component operating under dynamic clock and voltage scaling (DCVS). A determination is made, based at least in part on the received workload information, whether to send the at least one data packet from the first processing component to the second processing component or to a buffer, providing a cost effective ability to reduce power consumption and improved battery life in PCDs with multi-cores or multi-CPUs implementing DCVS algorithms or logic.

26 Claims, 7 Drawing Sheets

(56) References Cited

U.S. PATENT DOCUMENTS

| | | | |
|---|---|---|---|
| 2009/0249001 A1 | 10/2009 | Narayanan et al. | |
| 2011/0022871 A1 | 1/2011 | Bouvier et al. | |
| 2011/0138195 A1 | 6/2011 | Kim et al. | |
| 2011/0142064 A1* | 6/2011 | Dubal | H04L 47/122 370/412 |
| 2011/0145624 A1* | 6/2011 | Rychlik | G06F 1/3203 713/600 |
| 2011/0219382 A1 | 9/2011 | Hou | |
| 2012/0260258 A1 | 10/2012 | Regini et al. | |
| 2013/0097443 A1* | 4/2013 | Li | G06F 1/3206 713/322 |
| 2013/0159741 A1* | 6/2013 | Schluessler | 713/320 |
| 2013/0275617 A1* | 10/2013 | Rajan | H04L 47/32 709/233 |
| 2013/0290751 A1 | 10/2013 | Mondal et al. | |
| 2014/0089697 A1* | 3/2014 | Kim | G06F 1/26 713/320 |
| 2014/0101420 A1* | 4/2014 | Wu | G06F 1/3206 713/1 |
| 2014/0108665 A1* | 4/2014 | Arora | H04L 67/141 709/227 |
| 2014/0126577 A1* | 5/2014 | Post | G06F 9/5027 370/400 |
| 2014/0237134 A1* | 8/2014 | Branson | G06F 17/30442 709/231 |
| 2014/0304798 A1* | 10/2014 | Iyengar | H04L 63/1458 726/11 |
| 2015/0095620 A1* | 4/2015 | Ananthakrishnan | G06F 9/30083 712/220 |
| 2015/0261583 A1 | 9/2015 | Vanka et al. | |

OTHER PUBLICATIONS

Wojcik W., et al., "FPGA-Based Multi-Core Processor," Computer Science, 2013, pp. 459-474, vol. 14 (3).

* cited by examiner

SYSTEM AND METHOD FOR PROVIDING DYNAMIC CLOCK AND VOLTAGE SCALING (DCVS) AWARE INTERPROCESSOR COMMUNICATION

PRIORITY AND RELATED APPLICATIONS STATEMENT

This application claims priority under 35 U.S.C. §120 and is a continuation of U.S. patent application Ser. No. 14/210,064, filed on Mar. 13, 2014 and entitled, "SYSTEM AND METHOD FOR PROVIDING DYNAMIC CLOCK AND VOLTAGE SCALING (DCVS) AWARE INTERPROCESSOR COMMUNICATION," issued as U.S. Pat. No. 9,244,747, the entire contents of which are hereby incorporated by reference.

DESCRIPTION OF THE RELATED ART

Devices with a processor that communicate with other devices through wireless signals, including portable computing devices (PCDs), are ubiquitous. These devices may include mobile telephones, portable digital assistants (PDAs), portable game consoles, palmtop computers, and other portable electronic devices. In addition to the primary function of these devices, many include peripheral functions. For example, a mobile or cellular telephone may include the primary function of enabling and supporting telephone calls and the peripheral functions of a still camera, a video camera, global positioning system (GPS) navigation, web browsing, viewing videos, playing games, sending and receiving emails, sending and receiving text messages, push-to-talk capabilities, etc.

Modern PCDs typically include a system-on-a-chip (SoC) comprising one or more cores (e.g., central processing unit(s) (CPUs), video decoder, graphics processing unit(s) (GPU), modem processor, digital signal processor(s) (DSPs), etc.) for controlling or performing varying functions of the PCD. The presence of an increasing number of cores and/or CPUs can be problematic in the PCD setting as operating each core/CPU increases the power consumption on the PCD, reducing battery life. For example, as the functionality of PCDs increases, conventional SoC processors may exchange significant amounts of data between themselves as part of executing typical use cases (video playback for example) within the PCD. As content size grows larger every few months (like 1080P for video clips), these communication mechanisms can become a significant part of CPU load, increasing the power consumption. The communications mechanisms forming the CPU load can be in the form of remote procedure calls, shared memory calls, and other customized communication mechanisms.

In an effort to reduce power consumption, CPUs may implement some form of Dynamic Clock and Voltage Scaling (DCVS) algorithm running on them to minimize power consumption. A majority of these DCVS algorithms run based on the CPU load computed periodically in order to determine the best frequency for the CPU. One problem with these kinds of SoCs is when such a CPU receives multiple messages/interrupts at random times from a source (such as another CPU). Such repeated messages/interrupts may cause DCVS algorithm on the CPU receiving the messages/interrupts to react to this additional load caused by the messages/interrupts and take the CPU to its high/highest frequency which can significantly increase power consumption, contrary to the purpose of the DCVS algorithm. This increased power consumption can be especially problematic for PCDs, such as a mobile phone, running on a battery.

Thus, there is a need for improved systems and methods to minimize these sudden increases in clock frequency that can be caused by receiving random and sudden messages/interrupts at a CPU implementing a DCVS algorithm.

SUMMARY OF THE DISCLOSURE

Systems and methods are disclosed that allow for Dynamic Clock and Voltage Scaling (DCVS) aware interprocessor communications among processors such as those used in or with a portable computing device ("PCD"). During operation of the PCD at least one data packet is received at a first processing component. Additionally, the first processing component also receives workload information about a second processing component operating under dynamic clock and voltage scaling (DCVS). A determination is made, based at least in part on the received workload information, whether to send the at least one data packet from the first processing component to the second processing component or to a buffer.

One example embodiment is a PCD including a first processing component, where the first processing component configured to receive at least one data packet. The first processing component is in communication with a second processing component that is configured to operate under dynamic clock and voltage scaling (DCVS). A buffer is in communication with the first processing component and the second processing component. A counter is in communication with the second processing component, and the counter is configured to obtain workload information about the second processing component. The PCD also includes packet sending logic in communication with the first processing component and the counter. The packet sending logic is configured to receive the workload information from the counter and determine based at least in part on the received workload information whether to cause the at least one data packet to be sent to the second processing component or to the buffer.

Another example embodiment is a computer program product comprising a non-transitory computer usable medium having a computer readable program code embodied therein, said computer readable program code adapted to be executed to implement a method for a method for interprocessor communication in a portable computing device (PCD). The implemented method comprises: receiving at least one data packet at a first processing component; receiving at the first processing component workload information about a second processing component operating under dynamic clock and voltage scaling (DCVS; and determining based at least in part on the received workload information whether to send the at least one data packet from the first processing component to the second processing component or to a buffer.

Yet another example embodiment is a computer system for interprocessor communication in a portable computing device (PCD). The computer system comprising: means for receiving at least one data packet at a first processing component; means for receiving at the first processing component workload information about a second processing component operating under dynamic clock and voltage scaling (DCVS); means for determining based at least in part on the received workload information whether to send the at least one data packet from the first processing component to the second processing component or to a buffer.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

Figure 1:
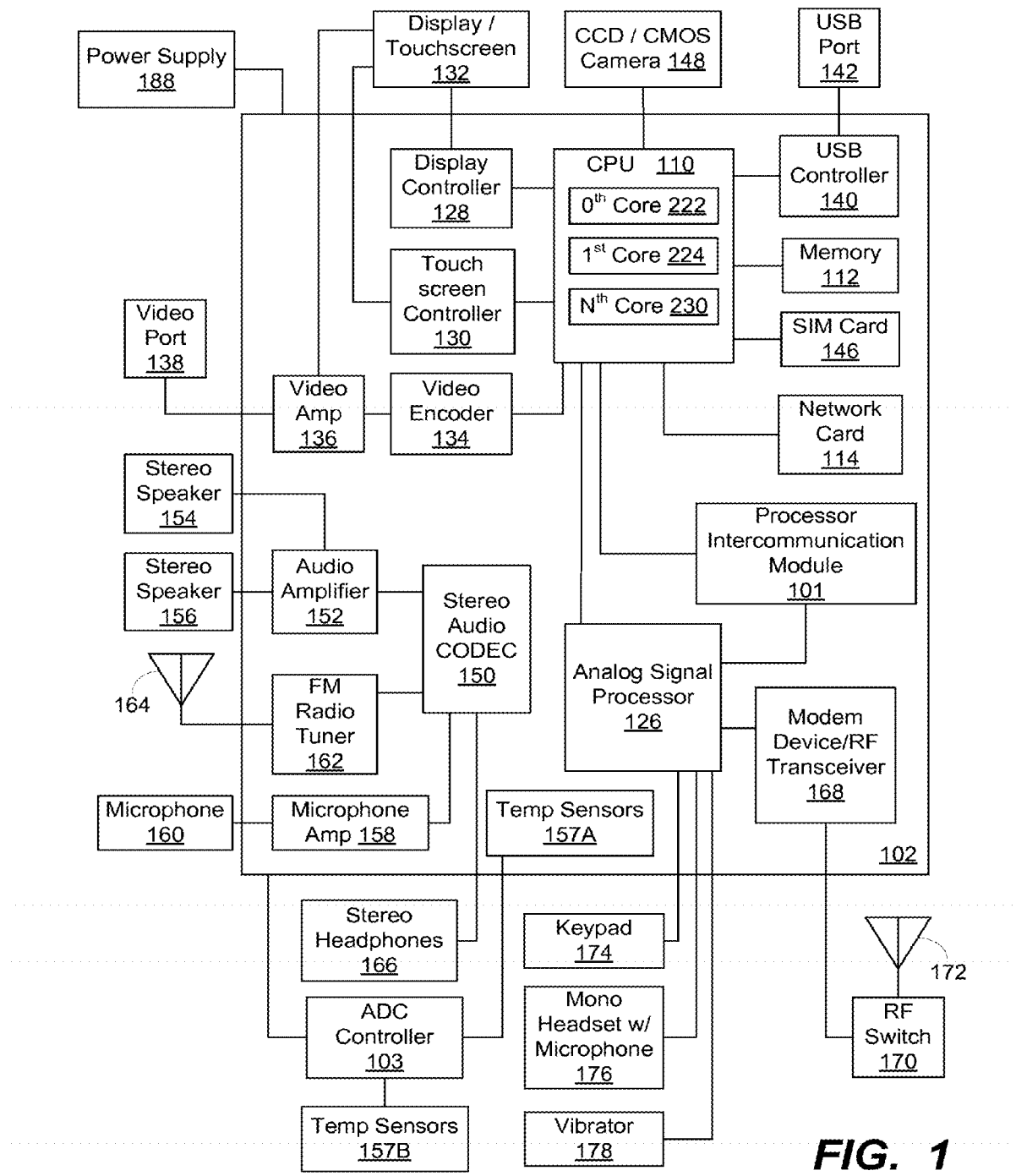
FIG. 1 is a block diagram of an example embodiment of a portable computing device (PCD) in which the present invention may be implemented.

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files or data values that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer-readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the term "portable computing device" ("PCD") is used to describe any device operating on a limited capacity rechargeable power source, such as a battery and/or capacitor. Although PCDs with rechargeable power sources have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop or tablet computer with a wireless connection, among others.

In this description, the terms "central processing unit ("CPU")," "digital signal processor ("DSP")," "graphics processing unit ("GPU")," "chip," "video codec," "system bus," "image processor," and "media display processor ("MDP")" are non-limiting examples of processing components that are controllable through dynamic clock and voltage scaling ("DCVS") techniques, and which may benefit from the present systems and methods. These terms for processing components are used interchangeably except when otherwise indicated. Moreover, as discussed below, any of the above or their equivalents may be implemented in, or comprised of, one or more distinct processing components generally referred to herein as "core(s)" and/or "sub-core(s)."

In this description, the terms "workload," "process load," "process workload," and "graphical workload" are used interchangeably and generally directed toward the processing burden, or percentage of processing burden, that is associated with, or may be assigned to, a given processing component in a given embodiment. Additionally, the related terms "frame," "code block" and "block of code" are used interchangeably to refer to a portion or segment of a given workload. For instance, a graphical workload may be comprised of a series of frames, as would be understood by one of ordinary skill in the art of video processing. Further to that which is defined above, a "processing component" or the like may be, but is not limited to being, a central processing unit, a graphical processing unit, a core, a main core, a sub-core, a processing area, a hardware engine, etc. or any component residing within, or external to, an integrated circuit within a portable computing device.

One of ordinary skill in the art will recognize that the term "MIPS" represents the number of millions of instructions per second a processor is able to process at a given power frequency. In this description, the term is used as a general unit of measure to indicate relative levels of processor performance in the exemplary embodiments and will not be construed to suggest that any given embodiment falling within the scope of this disclosure must, or must not, include a processor having any specific Dhrystone rating or processing capacity. Additionally, as would be understood by one of ordinary skill in the art, a processor's MIPS setting directly correlates with the power, frequency, or operating frequency, being supplied to the processor.

The present systems and methods for Dynamic Clock and Voltage Scaling (DCVS) aware interprocessor communications provide a cost effective ability to dynamically and adaptively determine whether to send a message, interrupt, remote procedure call, etc. from one core, central processing unit (CPU), or processing component (the "sending processing component") to another component, core or CPU (the "receiving processing component), where the receiving processing component implements a DCVS algorithm or logic.

In the present systems and methods, the when a sending processing component has data or data packets to communicate to the receiving processing component, the sending processing component does not automatically send the data or data packets. Instead, the sending processing component, or another component in communication with the sending processing component, determines whether or not to immediately send the data or data packets based at least in part on the current workload on the receiving processing component and/or whether or not immediately sending the data or data packets will cause increased power consumption at the receiving processing component (such as by operating at a higher frequency). The present systems and methods allow for reduced power consumption and improved battery life in PCDs with multi-cores or multi-CPUs implementing DCVS algorithms or logic.

During operation of the PCD at least one data packet is received at a first processing component. Additionally, the first processing component also receives workload information about a second processing component operating under dynamic clock and voltage scaling (DCVS). A determination is made whether to send the at least one data packet from the first processing component to the second processing component or to a buffer. The determination whether to send the at least one data packet to the second processing component is made based at least in part on the received workload information about the second processing component, and may include a determination of whether an active workload of the second processing component is above a threshold level. Additionally, the determination whether to send the at least one data packet from the first processing component to the second operation component or to a buffer may also be based in part on operational parameters. Exemplary operational parameters may include: the importance of the information contained within the data packet(s); the nature of the destination processing component to which the data is being sent (i.e. an active application or GPU); quality of service ("QoS"); the availability of buffers; the power "cost" of buffering the data; etc.

One example embodiment is a PCD including a first processing component, where the first processing component configured to receive at least one data packet. The first processing component is in communication with a second processing component that is configured to operate under dynamic clock and voltage scaling (DCVS). A buffer is in communication with the first processing component and the second processing component. A counter is in communication with the second processing component, and the counter is configured to obtain workload information about the second processing component. The PCD also includes packet sending logic in communication with the first processing component and the counter. The packet sending logic is configured to receive the workload information from the counter and determine based at least in part on the received workload information whether to cause the at least one data packet to be sent to the second processing component or to the buffer.

This ability to determine whether or not to send data packets from one processing component to a second processing component implementing DCVS based on the workload on the second processing component allows for improved power management of the PCD's processing components. One exemplary advantage is the ability to avoid sending interprocessor communications when the second processing component is busy. In such circumstances the second processing component may be operating at a level where the increased workload from the interprocessor communication would cause the DCVS of the second processing component to increase the power consumption, such as by operating at a higher frequency. If it is determined that the second processing component is busy and/or operating above a threshold level, the data from the first processing component may be deferred if possible (such as by buffering) until the second processing component is less busy. In this manner, the present systems and methods avoid a significant and often unnecessary increase in power consumption from interprocessor communications.

Although described with particular reference to operation within a PCD, the described systems and methods for dynamic voltage and voltage scaling (DCVS) aware interprocessor communications are applicable to any system with a processor, or processing subsystem where it is desirable to conserve power consumption, enhance performance, or improve quality of service. Stated another way, the described systems and methods may be implemented to provide dynamic voltage and voltage scaling (DCVS) aware interprocessor communications in a system other than in a portable device.

The system for dynamic voltage and voltage scaling (DCVS) aware interprocessor communications described herein, or portions of the system, may be implemented in hardware or software. If implemented in hardware, the devices can include any, or a combination of, the following technologies, which are all well known in the art: discrete electronic components, an integrated circuit, an application-specific integrated circuit having appropriately configured semiconductor devices and resistive elements, etc. Any of these hardware devices, whether acting or alone, with other devices, or other components such as a memory may also form or comprise components or means for performing various operations or steps of the disclosed methods.

When a PCD or other system described herein is implemented, or partially implemented, in software, the software portion can be used to receive at least one data packet at a first processing component, receive at the first processing component workload information about a second processing component operating under dynamic clock and voltage scaling (DCVS), or determine based at least in part on the received workload information whether to send the at least one data packet from the first processing component to the second processing component or to a buffer.

The software and data used in representing various elements can be stored in a memory and executed by a suitable instruction execution system (microprocessor). The software may comprise an ordered listing of executable instructions for implementing logical functions, and can be embodied in any "processor-readable medium" for use by or in connection with an instruction execution system, apparatus, or device, such as a single or multiple-core processor or processor-containing system. Such systems will generally access the instructions from the instruction execution system, apparatus, or device and execute the instructions.

FIG. 1 is a diagram showing a wireless device 110 communicating with a wireless communication system 100 in which embodiments of the present disclosure may be employed. The Each or any of the above systems may be generically referred to herein with the label "wireless communications protocol" or a "wireless communications technology."

FIG. 1 is a block diagram of an exemplary, non-limiting aspect of a PCD 100 that may implement the present systems and methods in the form of a wireless telephone capable of communicating with one or more wireless communication system. Such wireless communication system may be a broadband wireless communication system, including a Long Term Evolution (LTE) system, a Code Division Multiple Access (CDMA) system, a Frequency Division Multiple Access (FDMA) system, a Global System for Mobile Communications (GSM) system, a wireless local area network (WLAN) system, some other wireless system, or a combination of any of these. A CDMA system may implement Wideband CDMA (WCDMA), CDMA 1X, Evolution-Data Optimized (EVDO), Time Division Synchronous CDMA (TDSCDMA), or some other version of CDMA.

As shown, the PCD 100 includes an on-chip system 102 that includes a heterogeneous multi-core central processing unit ("CPU") 110 and an analog signal processor 126 that are coupled together. The CPU 110 may comprise a zeroth core 222, a first core 224, and an Nth core 230 as understood by one of ordinary skill in the art. Further, instead of a CPU 110, a digital signal processor ("DSP") may also be employed as understood by one of ordinary skill in the art. Moreover, as is understood in the art of heterogeneous multi-core processors, each of the cores 222, 224, 230 may process workloads at different efficiencies under similar operating conditions. Each of the cores 222, 224, 230 may control one or more function of the PCD 100. For example, the first core 224 may be a graphics processing unit (GPU) for controlling graphics in the PCD 100. Such GPU/first core 224 may further include drivers and/or other components necessary to control the graphics in the PCD 100, including controlling communications between the GPU core 326 and memory 112 (including buffers). For another example, a different core such as the Nth core 230 may control the camera 148 and such core 230 may further include drivers and/or other components necessary to control the camera 148, including communications between the core 230 and memory 112 (including buffers).

In some embodiments the PCD 100 may include a processor intercommunication ("PI") module 101 in communication with the multicore CPU 110 and/or one or more of the cores 222, 224, 230. The PI module 101 may operate to control some or all of the communications between the processing units/cores 222, 224, 230 as described below. The PI module 101 may comprise software which is executed by the multicore CPU 110. However, the PI module 101 may also be formed from hardware and/or firmware without departing from the scope of the invention. In other implementations, the PCD 100 may not include a separate PI module 101, but instead one or more of the cores 222, 224, 230 may have modules, components, logic, software, or firmware to control the communications with the other processing units/cores 222, 224, 230.

As illustrated in FIG. 1, a display controller 128 and a touch screen controller 130 are coupled to the multicore CPU 110. In turn, a display/touchscreen 132, external to the on-chip system 102, is coupled to the display controller 128 and the touch screen controller 130.

The PCD 100 of FIG. 1 may further include a video encoder 134, e.g., a phase alternating line (PAL) encoder, a sequential couleur a memoire (SECAM) encoder, or a national television system(s) committee (NTSC) encoder, or any other type of video decoder 134 coupled to the multicore CPU 110. Further, a video amplifier 136 is coupled to the video encoder 134 and the display/touchscreen 132. A video port 138 is coupled to the video amplifier 136. As depicted in FIG. 1, a universal serial bus (USB) controller 140 is coupled to the multicore CPU 110. Also, a USB port 142 is coupled to the USB controller 140. A memory 112 and a subscriber identity module (SIM) card 146 may also be coupled to the multicore CPU 110. In other embodiments, multiple SIM cards 146 may be implemented.

A digital camera 148 may be coupled to the multicore CPU 110. As discussed above, in such embodiments, the digital camera 148 may be controlled by one of the cores of the multicore CPU 110. In an exemplary aspect, the digital camera 148 is a charge-coupled device (CCD) camera or a complementary metal-oxide semiconductor (CMOS) camera.

As further illustrated in FIG. 1, a stereo audio CODEC 150 may be coupled to the multicore CPU 110. Moreover, an audio amplifier 152 may be coupled to the stereo audio CODEC 150. In an exemplary aspect, a first stereo speaker 154 and a second stereo speaker 156 are coupled to the audio amplifier 152. FIG. 1 shows that a microphone amplifier 158 may be also coupled to the stereo audio CODEC 150. Additionally, a microphone 160 may be coupled to the microphone amplifier 158. In a particular aspect, a frequency modulation (FM) radio tuner 162 may be coupled to the stereo audio CODEC 150. Also, a FM antenna 164 is coupled to the FM radio tuner 162. Further, stereo headphones 166 may be coupled to the stereo audio CODEC 150.

FIG. 1 further indicates that a modem device/radio frequency ("RF") transceiver 168 may be coupled to the multicore CPU 110. The modem device 168 may support one or more of the wireless communications protocols, such as GSM, CDMA, W-CDMA, TDSCDMA, LTE, and variations of LTE such as, but not limited to, FDB/LTE and PDD/LTE wireless protocols. Additionally, there may be multiple modem devices 168, and in such embodiments, different modem devices 168 may support come or all of the wireless communication protocols and/or technologies listed above.

In some implementations the modem device 168 may be further comprised of various components, including a separate processor, memory, and/or RF transceiver. In other implementations the modem device 168 may simply be an RF transceiver. Further, the modem device 168 may be incorporated in an integrated circuit. That is, the components comprising the modem device 168 may be a full solution in a chip. Additionally, various components comprising the modem device 168 may also be coupled to the multicore CPU 110. An RF switch 170 may be coupled to the modem device 168 and an RF antenna 172. In various embodiments, there may be multiple RF antennas 172, and each such RF antenna 172 may be coupled to the modem device 168 through an RF switch 170.

As shown in FIG. 1, a keypad 174 may be coupled to the multicore CPU 110 either directly, or through the analog signal processor 126. Also, a mono headset with a microphone 176 may be coupled to the multicore CPU 110 and or analog signal processor 126. Further, a vibrator device 178 may also be coupled to the multicore CPU 110 and/or analog signal processor 126. FIG. 1 also shows that a power supply 188 may be coupled to the on-chip system 102, and in some implementations the power supply 188 is coupled via the USB controller 140. In a particular aspect, the power supply 188 is a direct current (DC) power supply that provides power to the various components of the PCD 100 that require power. Further, in a particular aspect, the power supply 188 may be a rechargeable DC battery or a DC power supply that is derived from an alternating current (AC) to DC transformer that is connected to an AC power source.

The multicore CPU 110 may also be coupled to one or more internal, on-chip thermal sensors 157A as well as one or more external, off-chip thermal sensors 157B. The on-chip thermal sensors 157A may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157B may comprise one or more thermistors. The thermal sensors 157 may produce a voltage drop that is converted to digital signals with an analog-to-digital converter ("ADC") controller 103. However, other types of thermal sensors 157 may be employed without departing from the scope of the invention.

FIG. 1 further indicates that the PCD 110 may also include a network card 114 that may be used to access a data network, e.g., a local area network, a personal area network, or any other network. The network card 114 may be a Bluetooth network card, a WiFi network card, a personal area network (PAN) card, or any other network card well known in the art. Further, the network card 114 may be incorporated in an integrated circuit. That is, the network card 114 may be a full solution in a chip, and may not be a separate network card 114.

As depicted in FIG. 1, the display/touchscreen 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, and the power supply 180 are external to the on-chip system 102.

The on-ship system 102 may also include various bus controllers (not shown). For example, a first example of a may be responsive to signals in the bus interface that communicatively couples the CPU 110 to components of a multimedia subsystem, including the video encoder 134. It should be understood that any number of similarly configured bus controllers can be arranged to monitor a bus interface arranged in the on-chip system 102. Alternatively, a single bus controller could be configured with inputs arranged to monitor two or more bus interfaces that communicate signals between CPU 110 and various subsystems of the PCD 100 as may be desired.

In a particular aspect, one or more of the method steps described herein may be enabled via a combination of data and processor instructions stored in the memory 112. These instructions may be executed by one or more cores in the multicore CPU 110 in order to perform the methods described herein. Further, the multicore CPU 100, one or more of the cores 222, 224, 230, the memory 112, the PI module 101, or a combination thereof may serve as a means for executing one or more of the method steps described herein in order enable DCVS aware interprocessor communications.

Figure 2:
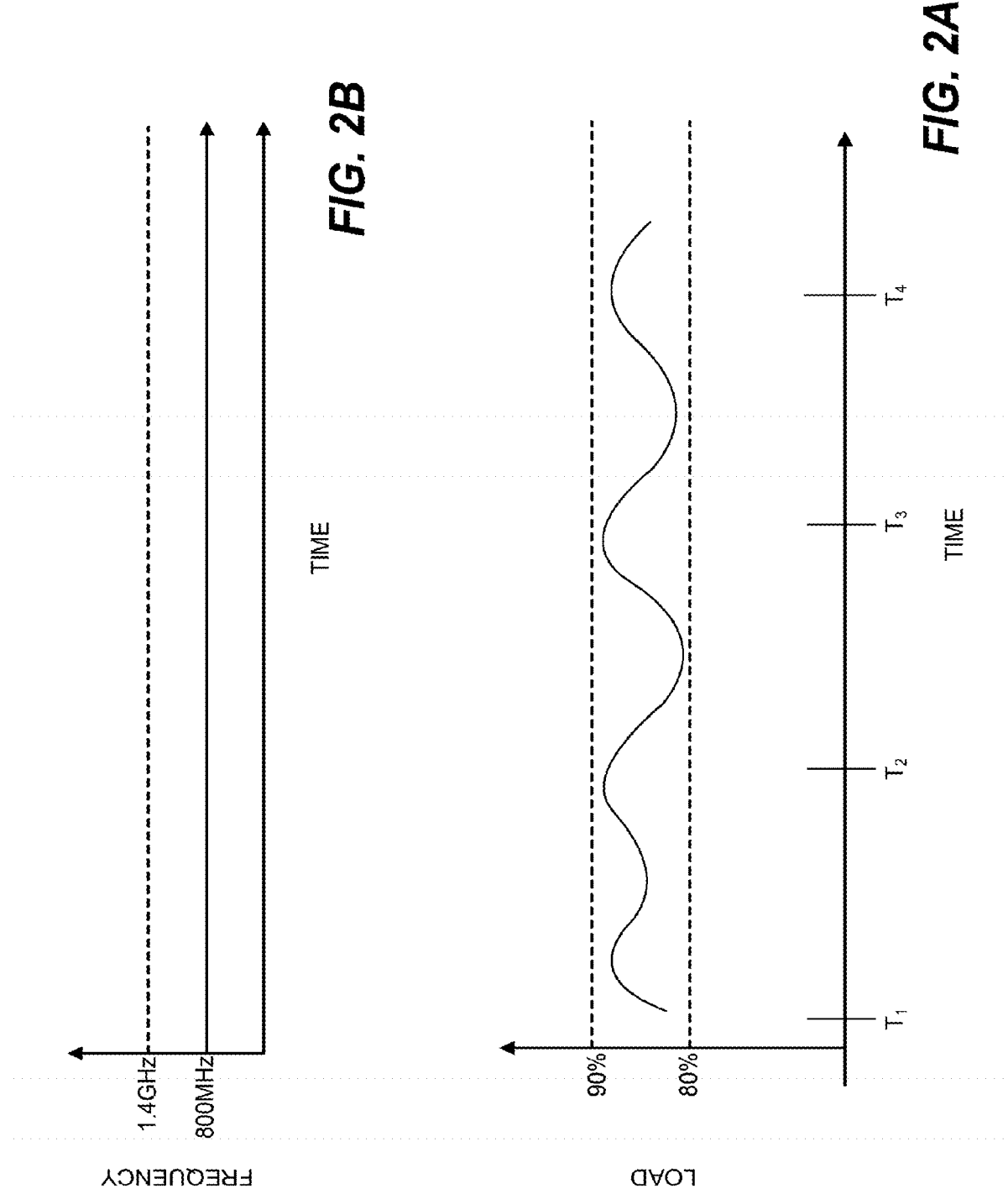
FIG. 2A is a graph illustrating an exemplary theoretical load over a period of time for a processing unit that may be implemented in the PCD embodiment illustrated in FIG. 1.
FIG. 2B is a graph illustrating the an exemplary frequency of the processing unit under the theoretical load illustrated in FIG. 2A.

FIG. 2A is a graph illustrating an exemplary theoretical load over a period of time for a processing component that may be implemented in the PCD illustrated in FIG. 1. In FIG. 2A, the vertical axis represents the load on the processing component. While FIG. 2A (as well as subsequent graph 3A) shows two boundaries for the load level—80% on the lower range and 90% on the upper range—these boundaries are for demonstrative purposes and any number of, or amount of, boundary levels may be available for the processing component. The horizontal axis represents time. While FIG. 2A shows four equal time intervals $T_1$-$T_4$, the load may be determined or measured over any number of equal or unequal time intervals as desired.

The load on the processing component illustrated by the curve in FIG. 2A represents the active workload on the processing component, and may be measured or determined in any desired manner. As illustrated in the example of FIG. 2A, the active workload of the processing component remains within the boundaries of 80% on the lower range and 90% on the upper range. Assuming that the processing component being measured in FIG. 2A implements a DCVS algorithm or logic, the measurement of the active workload within these ranges may cause the DCVS algorithm or logic to maintain the frequency of the processing unit at a steady state.

FIG. 2B is a graph illustrating an exemplary frequency of the processing component under the theoretical load illustrated in FIG. 2A. In the FIG. 2B graph, the vertical axis represents the operating frequency levels at which the processing component may be held, such as per instructions from a DCVS algorithm or logic. Notably, the FIG. 2B graph (as well as subsequent FIG. 3B graph) depicts two operating frequency levels available for a given processing component (800 MHz and 1.4 GHz); however, these operating frequency levels are for demonstrative purposes and it is envisioned that any number of operating frequency levels may be available for a given processing component, and that the specific frequencies may vary from those illustrated as desired. The horizontal axis represents time.

As illustrated in FIG. 2B, the processing component is being held by the DCVS at 800 MHz, the lower frequency of the processing component. As would be understood by one of ordinary skill in the art, operating the processing component at the lower frequency results in lower power consumption. Thus, as a result of the active workload for the processing component being determined/measured as staying under the upper boundary of 90% in FIG. 2A, the DCVS algorithm or logic of the processing unit holds the frequency of the processing component in a steady state at the lower frequency in FIG. 2B reducing the power consumption.

Figure 3:
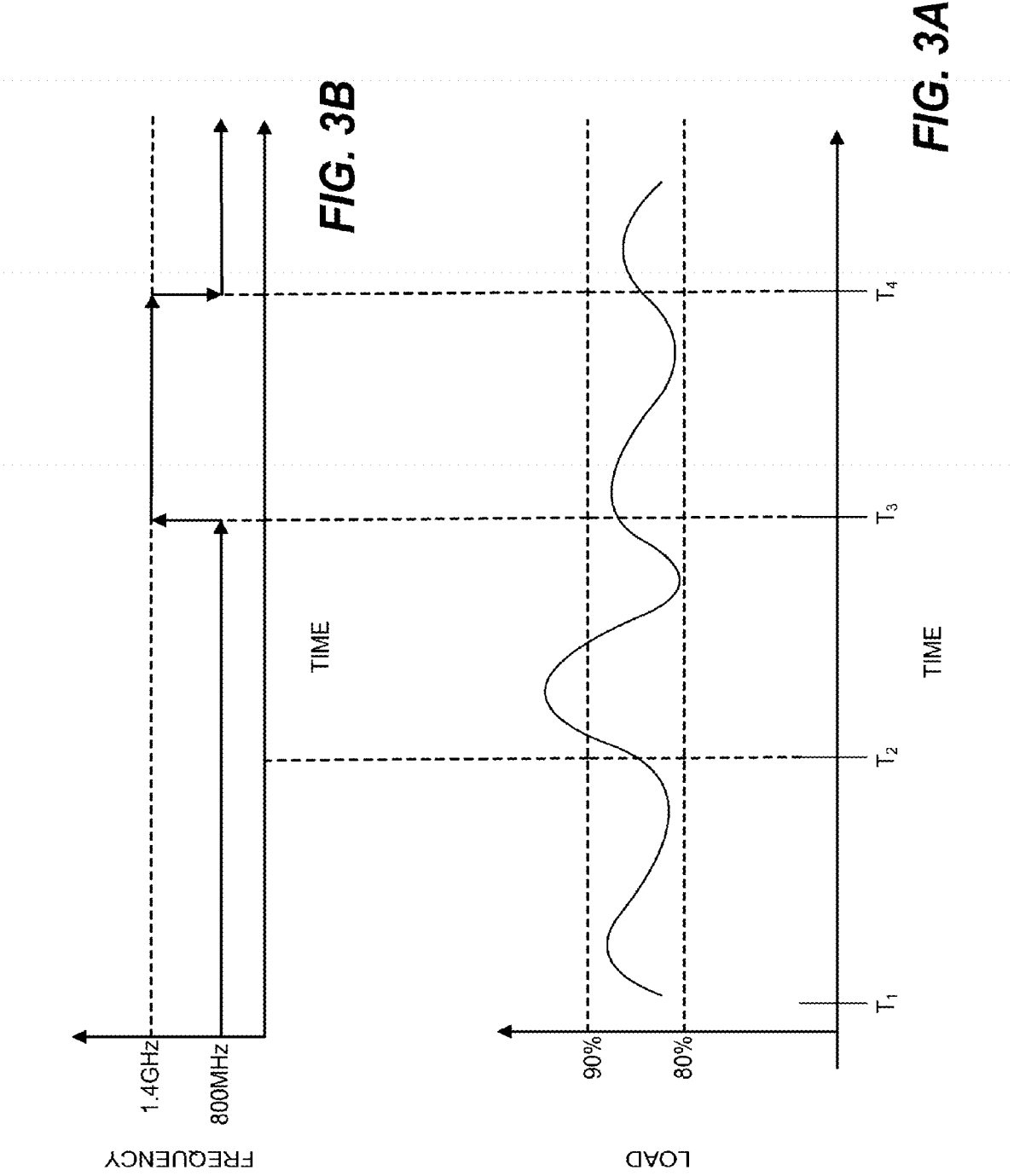
FIG. 3A is a graph illustrating another exemplary theoretical load over a period of time for a processing unit that may be implemented in the PCD embodiment illustrated in FIG. 1.
FIG. 3B is a graph illustrating the an exemplary frequency of the processing unit under the theoretical load illustrated in FIG. 3A.

However, the efforts of the DCVS algorithm or logic for a processing component to reduce power consumption can be undermined by communications from other processing components, as illustrated in FIGS. 3A-3B. FIG. 3A is a graph illustrating another exemplary theoretical load over a period of time for a processing component that may be implemented in the PCD embodiment illustrated in FIG. 1 In FIG. 3A, the vertical axis again represents the load on the processing component. While FIG. 3A shows two boundaries for the load level—80% on the lower range and 90% on the upper range—these boundaries are for demonstrative purposes and any number of, or amount of, boundary levels may be available for the processing component. The horizontal axis represents time. While FIG. 3A shows four equal time intervals $T_1$-$T_4$, the load may be determined or measured over any number of equal or unequal time intervals as desired.

The load on the processing component illustrated by the curve in FIG. 3A again represents the active workload on the processing component, and may be measured or determined in any desired manner. Different from the previous graph of FIG. 2A, in FIG. 3A, the active workload of the processing component rises above the upper boundary or 90% in the time interval $T_2$. Increases in the active workload of processing components may be caused by interprocessor communications from another processing unit—for example a message, interrupt, remote procedure call, shared memory call, etc. from another processing component, such as a different core 222, 224, 230 in the CPU 100. Such interprocessor communications received while the receiving processing component is already in an active state can result in one or more additional threads on the receiving processing component, increasing the active workload on the processing component. As illustrated in FIG. 3A, the active workload of the processing component may then return back below the 90% upper range for the time intervals $T_3$ and $T_4$.

As a result of the measurement of the active workload in time interval $T_2$ above the upper range of 90% as illustrated in FIG. 3A, the DCVS algorithm or logic of the processing component may cause the processing component to operate at a higher frequency for one or more time intervals as illustrated in FIG. 3B. FIG. 3B is a graph illustrating an exemplary frequency of the processing component under the theoretical load illustrated in FIG. 3A. In the FIG. 3B graph, the vertical axis again represents the operating frequency levels at which the processing component may be held, such as per instructions from a DCVS algorithm or logic. Notably, the FIG. 3B graph depicts two operating frequency levels available for a given processing component (800 MHz and 1.4 GHz); however, these operating frequency levels are for demonstrative purposes and it is envisioned that any number of operating frequency levels may be available for a given processing component, and that the specific frequencies may vary from those illustrated as desired. The horizontal axis represents time.

As illustrated in FIG. 3B, the processing component is being held by the DCVS at 800 MHz, the lower frequency of the processing component for the first two time intervals $T_1$ and $T_2$. However, as a result of the measurement or determination of an active workload above 90% (or whatever desired threshold) in $T_2$ the frequency of the processing component is increased to 1.4 GHz for at least time interval $T_3$. This increase of the processing component at the higher frequency can result in a significant increase in the power consumption of the processing component. Thus, as a result of an interprocessor communication from another processing component, the active workload for the processing component illustrated in FIGS. 3A-3B may be determined/measured as exceeding the upper boundary of 90% in FIG. 3A, resulting in an increase in the frequency of the processing unit in FIG. 3B, increasing the power consumption.

Figure 4:
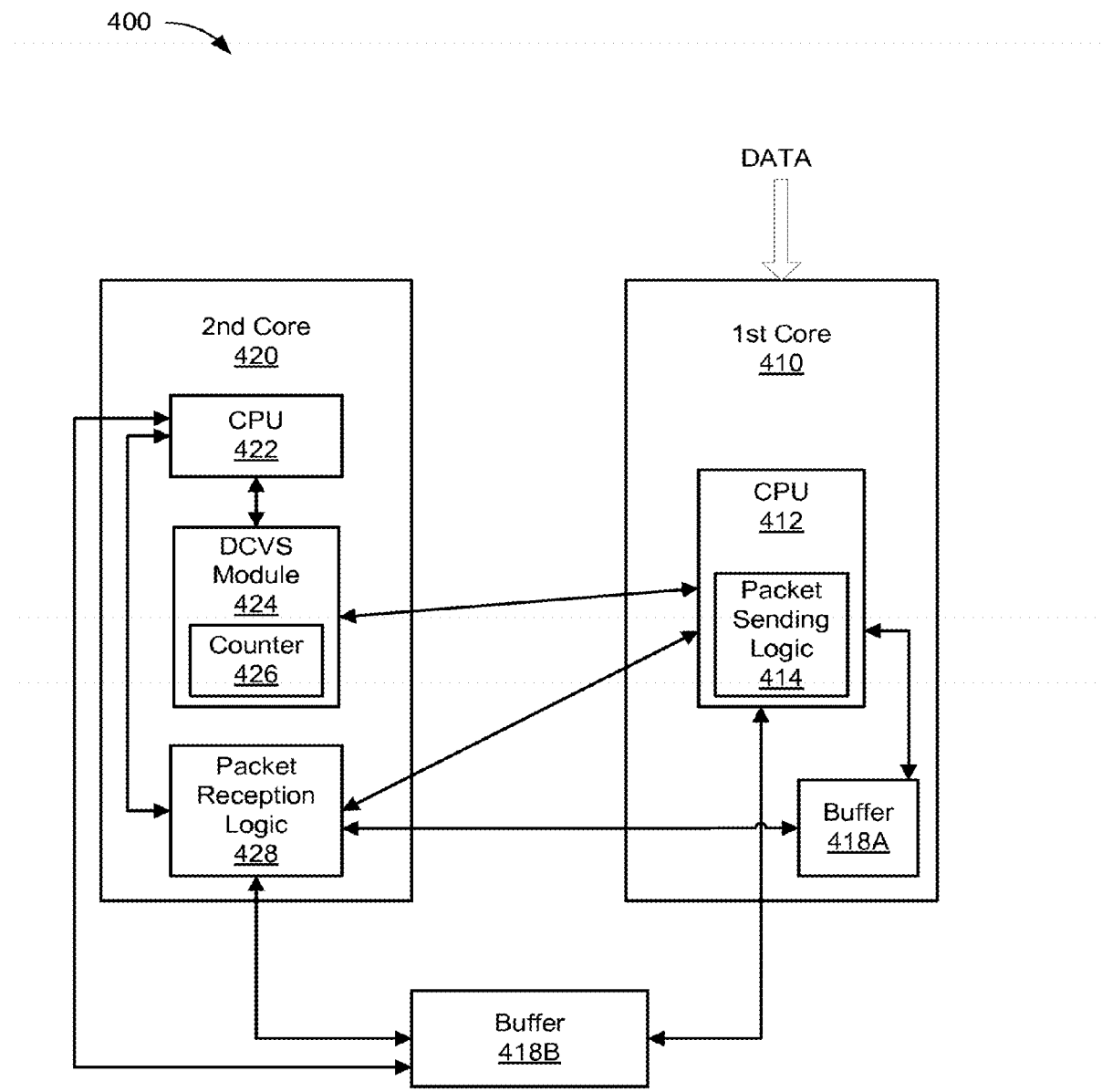
FIG. 4 is a block diagram showing an exemplary system for supporting dynamic voltage and voltage scaling (DCVS) aware interprocessor communications in a PCD.

FIG. 4 is a block diagram showing an exemplary system for supporting DCVS aware interprocessor communications in order to better manage power consumption by processing components. In the embodiment illustrated in FIG. 4, data is received by a first processing component, illustrated in FIG. 4 as a first core 410, which could be one of the cores 222, 224, 230 of the multicore CPU 110 illustrated in FIG. 1. The first core 410 could be any type of processor or core 222, 224, 230 in a PCD 100, including an application processor/core, a modem processor/core, a WiFi processor/core, a video decoder processor/core, an audio decoder processor/core, a GPU/graphics core, etc. In the implementation illustrated in FIG. 4, the first core 410 includes a processor, CPU 412, with packet sending logic 414 and at least one buffer 418 in communication with the CPU 412. As shown in FIG. 4, the buffer 418 may be a buffer 418A internal to the first core 410 (or to the CPU 412). Additionally, or alternatively, the buffer 418 may also be one or more external buffers 418B, including external buffers 481B that are shared by first core 410 and additional processing components.

The configuration of the features of the first core 410 in FIG. 4 is illustrative and non-limiting. For example, although shown as being contained on the CPU 412, in some embodiments the packet sending logic 414 may be a separate hardware or software component, module, or logic external to, but in communication with, the CPU 412 and/or the first core 410. Similarly, although the CPU 412 itself is illustrated as being contained within the first core 410, in some implementations the CPU 412 could be external to, but in communication with, the first core 410. Additionally, in some implementations the CPU 412 itself may comprise the first core 410.

The exemplary system of FIG. 4 also includes a second processing component in communication with the first processing component, illustrated as a second core 420 in communication with the first core 410. The second core 420 may also be any type of processor or core 222, 224, 230 in a PCD 100, including an application processor/core, a modem processor/core, a WiFi processor/core, a video decoder processor/core, an audio decoder processor/core, a GPU/graphics core, etc. In the implementation illustrated in FIG. 4, the second core 420 includes a processor, CPU 422. Although the CPU 422 is illustrated as being contained within the second core 420, in some implementations the CPU 422 could be external to, but in communication with, the second core 420. Additionally, the in some implementations the CPU 422 itself may comprise the second core 420.

As illustrated in FIG. 4, the CPU 422 is in communication with a DCVS module 424. The DCVS module 424 performs dynamic clock and voltage scaling for the second core 420 and/or processor CPU 422 of the second core 420. The DCVS module 424 may be implemented in hardware, software, or firmware as desired.

Additionally, although illustrated as an external to the CPU 422, the DCVS module 424 may instead be part of the CPU 422. Similarly, the DCVS module 424 may also be located external to, but in communication with the second core 420. Regardless of how implemented, the DCVS module 424 performs at least some form of power consumption regulation for the second core 420 and/or CPU 422 in response to the active workload, such as for example the operating frequency adjustments discussed above with respect to FIGS. 2A-2B and 3A-3B.

The illustrated DCVS module 424 includes a counter 426 for measuring the active workload of the second core 420 and/or CPU 422 in a manner that may be read by, or communicated to, the packet sending logic 414 of the first core 410. In some implementations, the counter 426 may be a component or part of the DCVS module 424. In such implementations, the counter 426 may, for example, be logic within the DCVS module 424 that counts busy clock cycles the second core 420 and/or CPU 422 spent executing non-idle threads in the current sampling period/time interval. In other implementations, the counter 426 may be a hardware, software, or firmware module, counter, or component separate from the DCVS module 424 that reads or receives information from the DCVS module 424.

The second core 420 may also include packet reception logic 428 as illustrated in FIG. 4 for controlling data or data packets received by the second core 420 from other cores such as first core 410. The packet reception logic 428 and/or CPU 424 of the second core 420 may be in communication with one or more external buffers 418B as illustrated in FIG. 4. External buffer 418B may also be in communication with other processing components such as first core 410 and/or the CPU 412 of the first core 410. Packet reception logic 428 may be implemented in hardware, software, or firmware. Additionally, the packet reception logic 428 may be external from, or may be included within, the CPU 422 of the second core 420 in various embodiments.

In operation, the system 400 of FIG. 4 allows for DCVS aware interprocessor communications, such as between first core 410 and second core 420. As illustrated in FIG. 4, the first core 410, a WiFi core for example, receives one or more streams of data, each stream comprised of data packets. In some implementations the CPU 412 of the first core 410 may determine that one or more of the received data packets needs to be sent to one or more additional processing components such as the second core 420 which in this example is a core for operating applications. In other implementations, another element or component may make the determination that one or more of the received data packets needs to be sent to one or more additional processing components. Such other elements or component may be part of the first core 410, such as the packet sending logic 414. Alternatively, such other elements may be external to the first core 410, such as an element or component making the determination prior to the data being sent to the first core 410 and communicating the determination to the first core 410 with the data.

Rather than simply forwarding the data packets to the other processing components such as second core 420, the first core 410 first checks the active workload of any destination processing components, including second core 420. In the exemplary system of FIG. 4, the packet sending logic 414 of first core 410 receives information from the counter 426 of the second core 420 in order to "read" or determine the active workload of the second core 420 and/or the CPU 422 of the second core 420. The active workload can be read or received in any manner desired, and may be in any desired form such as a "busy percentage" of the second core 420/CPU 422 or a number busy clock cycles the second core 420/CPU 422 spent executing non-idle threads in the current sampling period.

In some implementations, the packet sending logic 414 may communicate directly with the DCVS module 424 and/or counter 426 of the second core 420 in order to "read" the active workload of the second core 420 and/or the CPU 422. In other implementations, the CPU 412 of the first core 410 may communicate with the DCVS module 424 and/or counter 426 of the second core 420 in order to "read" the active workload, in which case the CPU 412 passes the information about the active workload of the second core 420/CPU 422 to the packet sending logic 414.

The packet sending logic 414 then uses the received information about the active workload of the second core 420/CPU 422 to determine whether to immediately send the data packet(s) to the second core 420/CPU 422, or whether to delay sending the data packets to the second core 420/CPU 422, such as by temporarily storing the data packet(s) in buffer 418A or 418B.

In one exemplary embodiment the received information about the active workload of the second core 420/CPU 422 may be a busy percentage for the second core 420/CPU 422. In that implementation, the packet sending logic 414 may decide whether immediately sending the data packet(s) to the second core 420/CPU 422 will result in an increase in the active workload of the second core 420/CPU 422. This decision may also include determining whether the increased active workload will cause the DCVS module 424 of the second core 420 to increase the power consumption of the second core 420/CPU 422, such as by raising the operating frequency of the second core 420/CPU 422.

In one implementation, the packet sending logic 414 may perform this determination by evaluating whether or not the active workload of the second core 420/CPU 422 will increase above a pre-determined threshold, such as the 90% threshold discussed above for FIGS. 2A-2B and 3A-3B requiring the DCVS module to increase the operating frequency of the second core 420/CPU 422. This evaluation could be made by the packet sending logic 414 comparing the received active workload percentage of the destination processing component to a threshold value, by the packet sending logic 414 receiving the active workload percentage of the destination processing component and estimating the increase in workload that would be caused by sending the data immediately, or by any other desired method.

If immediately sending the data packet(s) to the second core 420/CPU 422 would result in a busy percentage increase above the 90% threshold, the packet sending logic 414 may determine to not immediately send the data packet(s) to the second core 420/CPU 422, and instead store the data packet(s) in one or more buffer 418A, 418B. The packet sending logic 414 may then continue to receive information about the active workload of the second core 420/CPU 422 until the packet sending logic 414 determines that sending the data packet(s) would not increase the active workload of the second core 420/CPU 422, or until the packet sending logic 414 determines that the data packet(s) must be sent to the second core 420/CPU 422 in order to avoid the data packet(s) timing out. In such circumstances, the packet sending logic 414 could cause the data packet(s) to be sent from the buffer 418A, 418B to the second core 420/CPU 422. Alternatively, the packet sending logic 414 could cause the second core 420/CPU 422 to retrieve the data packet(s) from a shared buffer 418B, such as through a shared memory call to the second core 420/CPU 422.

The determination by the packet sending logic 414 of whether to immediately send the data packet(s) to the second core 420/CPU 422 may be also based in part on other considerations, such as operational parameters. Exemplary operational parameters that may be evaluated when making the determination include: the importance of the information contained within the data packet(s); the nature of the destination processing component to which the data is being sent (i.e. an active application or GPU); quality of service ("QoS"); the availability of buffers; the power "cost" of buffering the data; etc. The evaluation or determination of these various operational parameters may be made by an algorithm or series of algorithms, giving weight to any desired parameter or optimization outcome. Alternatively, the evaluations or determinations may be made by any other desired means, such as a look-up table.

One illustration of consideration of such factors may be if the data multimedia data received over a 3G connection to the PCD 100. The importance to QoS of being able to provide such information to the PCD 100 user quickly and without interruption may cause the packet sending logic 414 to determine to provide the information to another processing component, such as a GPU or video decoder immediately, even if the destination processing component(s) are busy and sending the information would result in the destination processing component(s) being operated at a high frequency.

On the other hand, if the data being received by the first core 410 is a file download such as an update to various applications, the lower immediate importance of such information, and minimal impact of such information on QoS, may cause the packet sending logic 414 to determine that the information should be buffered if there is any chance that sending the data to a destination processing component would result in operation in a higher power consumption mode.

By way of another example, the packet sending logic 414 may consider whether due to the architecture of the PCD 100, the current operating conditions of the PCD 100, and/or other reasons, the power cost of buffering the data received by the first core 410 is high and/or higher than the power cost of increasing the level of operation of the destination processing component. In such circumstances, the packet sending logic 414 may determine to immediately send the data to the second processing component, even if the active workload for that second processing unit would otherwise warrant buffering the data packet(s). Alternatively, in such circumstances, the determination process of the packet sending logic 414 may be tuned, such as by increasing the active workload threshold value for when data will be sent to the second/destination processing component, in order to minimize the buffering cost while still trying to obtain power savings by deferring data packet delivery to the second/destination processing component when possible.

For ease of understanding, FIG. 4 illustrates a first core 410 that receives data a second core 420 that is a destination processing component for an interprocessor communication. It is envisioned that at times the second core 420 (or additional processing components not shown) may receive data, in which case the first core 410 may be the destination processing component for the interprocessor communication, with corresponding components of the second core 420 communicating with the first core 410 and making the determination of whether to immediately send data or data packet(s) to the first core 410 or whether to buffer the data packet(s), such as in buffer 418B.

Similarly, it is to be understood that while FIG. 4 illustrates only one destination processing component (second core 420), in some embodiments there may be multiple destination processing components to which the first core 410 in FIG. 4 may send some, or all, of the received data packets. In such embodiments, the packet sending logic 414 of the first core 410 may make the determination(s) described above independently for each destination processing component based on any of the above-listed factors or considerations, or based on any additional factors or considerations desired. It is not necessary in such embodiments that the packet sending logic 414 apply the same thresholds, evaluate the same factors or considerations, and/or weight similar factors or considerations the same when making the determination for each destination processing component. Thus, the packet sending logic 414 may determine that a specified set of data packets should immediately be sent to one destination processing component, but that the same data packets should be buffered rather than sent immediately to a second destination processing component, even if the first destination processing component is currently operating at a higher active workload than the second destination processing component.

Figure 5:
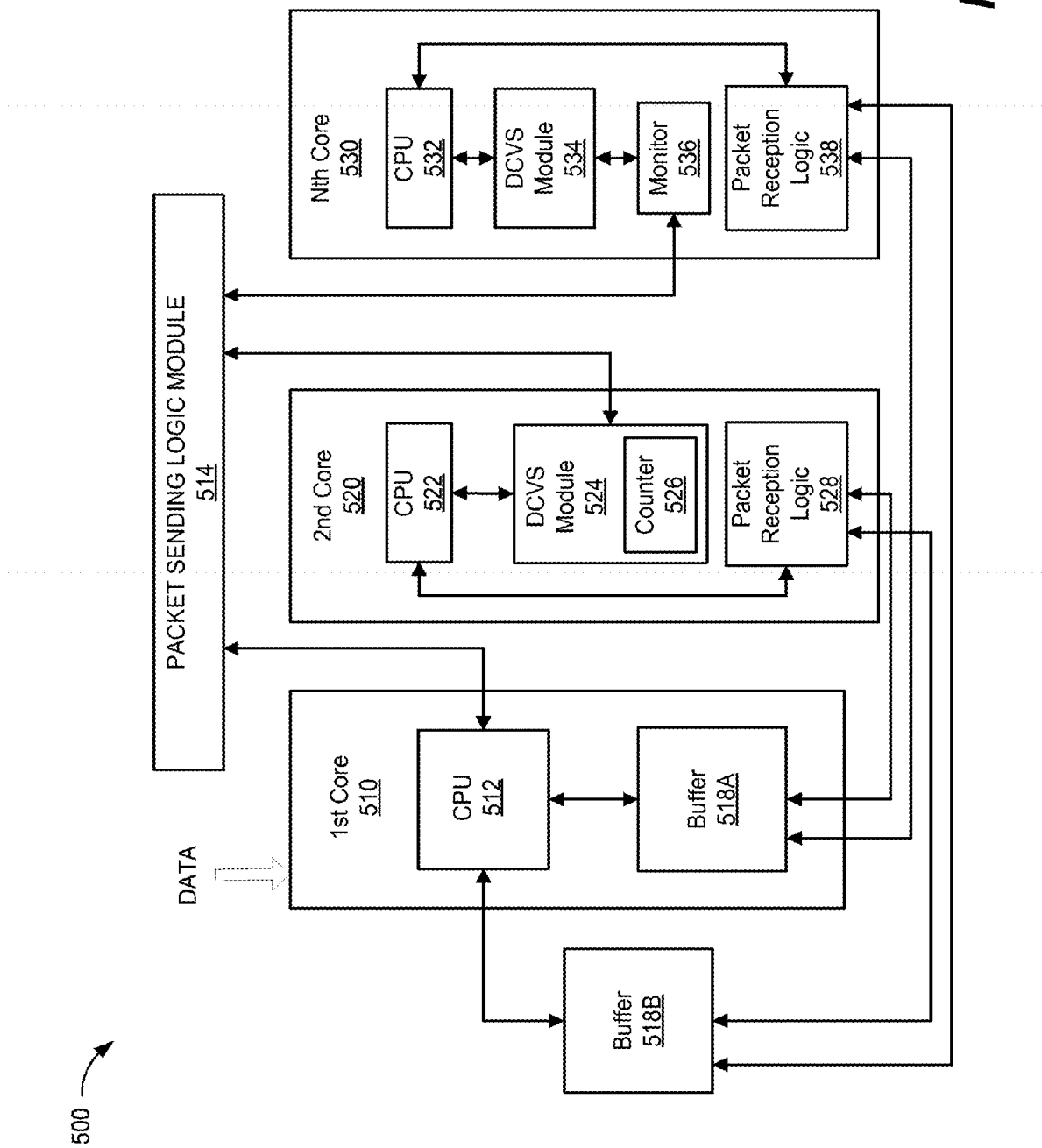
FIG. 5 is a block diagram showing another exemplary system for supporting dynamic voltage and voltage scaling (DCVS) aware interprocessor communications in a PCD.

FIG. 5 is a block diagram showing another exemplary system for supporting DCVS aware interprocessor communications in order to manage power consumption by processing components. The system 500 illustrated in FIG. 5 includes a source processing component that is receiving data (first core 510) and two destination processing components (second core 520 and Nth core 530). Although two destination processing components are illustrated for ease of understanding, the system 500 may include any number of destination processing components.

The embodiment of the system 500 illustrated in FIG. 5 is similar to the system 400 of FIG. 4, except that the system 500 of FIG. 5 implements a separate and/or or centralized packet sending logic module 514 in communication with each of the first core 510, second core 520, and Nth core 530. The packet sending logic module 514 in of system 500 is operable to provide DCVS aware interprocessor communications between first core 510, second core 520, and Nth core 530 in a manner similar to that described above for FIG. 4.

Each of the first core 510, second core 520, and Nth core 530 could be any type of processor or core 222, 224, 230 (see FIG. 1) in a PCD 100, including an application processor/core, a modem processor/core, a WiFi processor/core, a video decoder processor/core, an audio decoder processor/core, a GPU/graphics core, etc. In the implementation illustrated in FIG. 5, the first core 510 includes a processor, CPU 512, and at least one buffer 518 in communication with the CPU 512. As shown in FIG. 5, the buffer 518 may be a buffer 518A internal to the first core 510 (or to the CPU 512). Additionally, or alternatively, the buffer 518 may also be one or more external buffers 518B, including external buffers 581B that are shared by first core 510 and additional processing components, such as second core 520 and/or Nth core 530.

The configuration of the features of the first core 510 in FIG. 5 is illustrative and non-limiting. For example, although the CPU 512 itself is illustrated as being contained within the first core 510, in some implementations the CPU 512 could be external to, but in communication with, the first core 510. Additionally, in some implementations the CPU 512 itself may comprise the first core 510.

The exemplary system of FIG. 5 also includes a second and third processing component in communication with the first processing component, illustrated as a second core 520 and Nth core 530 in communication with the first core 510. In the implementation illustrated in FIG. 5, the second core 520 includes a processor, CPU 522 and the Nth core 530 includes a processor, CPU 532. Although the CPUs 522 and 532 is illustrated as being contained within the second core 520 and Nth core 530 respectively, in some implementations the CPUs 522 and 532 could be external to, but in communication with, the second core 520 and Nth core 530 respectively. Additionally, the in some implementations the CPUs 522 and 532 themselves may comprise the second core 520 and Nth core 530 respectively. In yet other implementations the second core 520 and the Nth core 530 may share one CPU 522 that performs processing for both cores 520 and 530.

As illustrated in FIG. 5, the CPU 522 of the second core 520 is in communication with a DCVS module 524. Similarly, the CPU 532 of the Nth core 530 is in communication with a DCVS module 534 for the Nth core 530. The DCVS modules 524 and 534 perform dynamic clock and voltage scaling for the second core 520/CPU 522 and Nth core 530/CPU 532 respectively. The DCVS modules 524 and 534 may be implemented in hardware, software, or firmware as desired. Additionally, although illustrated as an external to the CPUs 522 and 532, the DCVS modules 524 and 534 may instead be part of the CPUs 522 and 532 respectively. Similarly, the DCVS modules 524 and 534 may also be located external to, but in communication with the second core 520 and Nth core 530 respectively. Regardless of how implemented, the DCVS modules 524 and 534 perform some form of power consumption regulation of their respective cores 520 or 530 and/or CPUs 522 or 532 in response to the active workload, such as for example the operating frequency adjustments discussed above with respect to FIGS. 2A-2B and 3A-3B.

The illustrated DCVS module 524 for the second core 520 includes a counter 526 for measuring or recording the active workload of the second core 520 and/or CPU 522 in a manner that may be read by, or communicated to, the packet sending logic module 514. In some implementations, the counter 526 may be a component or part of the DCVS module 524. In such implementations, the counter 526 may, for example, be logic within the DCVS module 524 that counts busy clock cycles the second core 520 and/or CPU 522 spent executing non-idle threads in the current sampling period/time interval.

In contrast, the Nth core 530 contains a monitor 536 external to the DCVS module 534 for the Nth core 530 for measuring, recording, or receiving information about the active workload of the Nth core 530 and/or CPU 532. The monitor similarly 536 stores the workload information in a manner that may be read by, or communicated to, the packet sending logic module 514. The monitor 536 may be a hardware, software, or firmware module or component in communication with the DCVS module 534, and may be located within the Nth core 530 or CPU 532, or external to, but in communication with the Nth core 530 or CPU 532. Both the monitor 536 of the Nth core 530 and the counter 526 of the second core 520 serve to provide information to, or allow information to be read by, the packet sending logic module 514, including in a manner similar that described above with respect to FIG. 4.

The second core 520 and Nth core 530 may also include packet reception logic 528 and 538 respectively, as illustrated in FIG. 5 for controlling data or data packets received by the second core 520 and Nth core 530 from other processing components such as first core 510. The packet reception logic 528 and/or CPU 524 of the second core 520 may be in communication with one or more external buffers 518B as illustrated in FIG. 5. Similarly, the packet reception logic 538 and/or CPU 534 of the Nth core 530 may also be in communication with one or more external buffers 518B. External buffer 518B may also be in communication with the packet sending logic module 514 and other processing components such as first core 510 and/or the CPU 512 of the first core 510. The packet reception logics 528 and 538 may be implemented in hardware, software, or firmware. Additionally, the packet reception logics 528 and 538 may be external from, or may be included within, the CPU 522 of the second core 520 and the CPU 532 of the Nth core 530, respectively, in various embodiments.

In operation, the packet sending logic module 514 of the system 500 of FIG. 4 allows for DCVS aware interprocessor communications, such as between first core 510 and second core 520 and/or Nth core 530. As illustrated in FIG. 5, the first core 510, a WiFi core for example, receives one or more streams of data, each stream comprised of data packets. In some implementations, the CPU 512 of the first core 510 may determine that one or more of the received data packets needs to be sent to one or more additional processing components such as the second core 520 and/or Nth core 530.

In other implementations, another element or component may make the determination that one or more of the received data packets needs to be sent to one or more additional processing components. Such other elements or component may be part of the first core 510. Such other elements or components may also be external to the first core 410, such as the packet sending logic module 514, or an element or component making the determination prior to the data being sent to the first core 510 and communicating the determination to the first core 510 with the data.

Rather than simply allowing the first core 510 to forward the data packets to the other processing components such as second core 520 or Nth core 530, the packet sending logic module 514 first checks the active workload of any such destination processing components, similar to the system 400 discussed above in FIG. 4. In the exemplary system of FIG. 5, the packet sending logic module 514 receives information from the counter 526 of the second core 520 and the monitor 536 of the Nth core 530 in order to "read" the active workload of the respective cores 520 and 530 and/or their respective CPUs 522 and 532. As discussed above, the active workload can be read in any manner desired, such as a "busy percentage" of the second core 520/CPU 522 and/or Nth core 530/CPU 522, or as a number busy clock cycles the second core 520/CPU 522 and/or Nth core 530/CPU 532 spent executing non-idle threads in the current sampling period.

The packet sending logic module 514 may communicate directly with the DCVS module 524 and/or counter 526 of the second core 520 in order to "read" the active workload of the second core 520 and/or the CPU 522. Similarly, the packet sending logic module 514 may communicate directly with the monitor 536 of the Nth core 530 in order to "read" the active workload of the Nth core 530 and/or the CPU 532. The packet sending logic module 514 then uses the received information about the active workload of the second core 420/CPU 422 and/or Nth core 530/CPU 532 to determine whether to immediately send the data packet(s) to either of the cores 520 or 530 (or their respective CPUs 522 or 532), or whether to delay sending the data packets to one or more of the second core 520/CPU 522 or Nth core 530/CPU 532, such as by temporarily storing the data packet(s) in buffer 518B.

In one exemplary embodiment the received information about the active workload of the second core 520/CPU 522 may be a busy percentage for the second core 520/CPU 522. In that implementation, the packet sending logic module 514 may determine whether immediately sending the data packet(s) to the second core 520/CPU 522 will result in an increase in the active workload of the second core 520/CPU 522. This determination may also include determining whether the increased active workload will cause the DCVS module 524 of the second core 520 to increase the power consumption of the second core 520/CPU 522, such as by raising the operating frequency of the second core 520/CPU 522.

In one implementation, the packet sending logic module may perform this determination by evaluating whether or not the active workload of the second core 520/CPU 522 will increase above a pre-determined threshold, such as the 90% threshold discussed above for FIGS. 2A-2B and 3A-3B requiring the DCVS module 524 to increase the power consumption (such as by increasing the operating frequency) of the second core 520/CPU 522. This evaluation could be made by the packet sending logic module 514 comparing the received active workload percentage of the destination processing component to a threshold value, by the packet sending logic module 514 receiving the active workload percentage of the destination processing component and estimating the increase in workload that would be caused by sending the data immediately, or by any other desired method.

In the above example, the received information about the active workload of the Nth core 530/CPU 532 may also be a busy percentage for the Nth core 530/CPU 532, and the packet sending logic module 514 may make a similar determination about the active workload of the Nth core 530/CPU 532. However, it is not necessary that the type of information received the active workload of the Nth core 530/CPU 532 be the same type of information received about the active workload of the second core 520/CPU 522. For example, the packet sending logic module 514 may obtain or receive busy percentage information about the workload of the second core 520/CPU 522, while obtaining or receiving a different type of information from the monitor 536 of the Nth core 530 indicating the active workload of the Nth core 530/CPU 532.

Regardless of the type of information received, the packet sending logic module 514 will determine for each of the second core 520/CPU 522 and Nth core 530/CPU 532 whether immediately sending the data packet(s) would result in an increase in the power consumption of the second core 520/CPU 522 and/or Nth core 530/CPU 532, such as by an increase in the operating frequency of either core 520/530 and/or CPU 522/532. In that event, the packet sending logic module 514 may determine to not immediately send data packet(s) to one or more of the second core 420/CPU 422 and Nth core 530/CPU 532, and instead store the data packet(s) in one or more buffer 418B.

The packet sending logic module 514 may then continue to receive information about the active workload of the second core 520/CPU 522 and/or Nth core 530/CPU 532 until the packet sending logic module 514 determines that sending the data packet(s) would not increase the active workload of the respective cores 520/530 or CPUs 522/532, or until the packet sending logic module 514 determines that the data packet(s) must be sent in order to avoid the data packet(s) timing out. In such circumstances, the packet sending logic module 514 could cause the data packet(s) to be sent from the buffer 418B to the appropriate destination core 520/530 or CPU 522/532. Alternatively, the packet sending logic module 514 could cause the second core 520/CPU 522 and/or Nth core 530/CPU 532 to retrieve the data packet(s) from a shared buffer 418B, such as through a shared memory call to the second core 520/CPU 522 or Nth core 530/CPU 532.

As discussed above, the determination by the packet sending logic module 514 whether to immediately send the data packet(s) to either of the second core 520/CPU 522 or Nth core 530/CPU 532 may be also based in part on other considerations, such as operational parameters. Exemplary operational parameters that may be evaluated when making the determination include: the importance of the information contained within the data packet(s); the nature of the destination processing component to which the data is being sent (i.e. an active application or GPU); quality of service ("QoS"); the availability of buffers; the power "cost" of buffering the data; etc. The evaluations or determinations by the packet sending logic module 514 may be made by an algorithm or series of algorithms, giving weight to any desired factor, consideration, or optimization outcome; or may be made by any other desired means, such as a look-up table.

Similarly, it is to be understood that while FIG. 5 illustrates two destination processing components (second core 520 and Nth core 530), in some embodiments there may be additional destination processing components to which the first core 5410 in FIG. 5 may send some, or all, of the received data packets. As discussed, the packet sending logic module 514 may make the above-described determination(s) and/or evaluation(s) independently for each destination processing component based on any of the above-listed factors or considerations, or based on any additional factors or considerations desired. It is not necessary that the packet sending logic module 514 apply the same thresholds, evaluate the same factors or considerations, and/or weight similar factors or considerations the same when making the determination for each destination processing component. Thus, the packet sending logic module 514 may determine that a specified set of data packets should immediately be sent to the second core 520/CPU 522, but that the same data packets should be buffered rather than sent immediately to the Nth core 530/CPU 532 (or some other processing component), even if the second core 520/CPU 522 is currently operating at a higher active workload than the Nth core 530/CPU 532.

Additionally, determinations by the packet sending logic 412 of FIG. 4 and/or packet sending logic module 514 of FIG. 5 may also be adaptively changed to reflect new conditions, allowing for improved and/or more precise optimization and power consumption reduction from interprocessor communications. Although described in terms of communications between processor components in a PCD 100 herein for ease of understanding, the principles of systems 400 and 500, and method 600 (FIG. 6*a*-6B) are equally applicable to other types of processor components, such as processor components, processors, cores, etc. modem subsystem in any computer system.

Figure 6A:
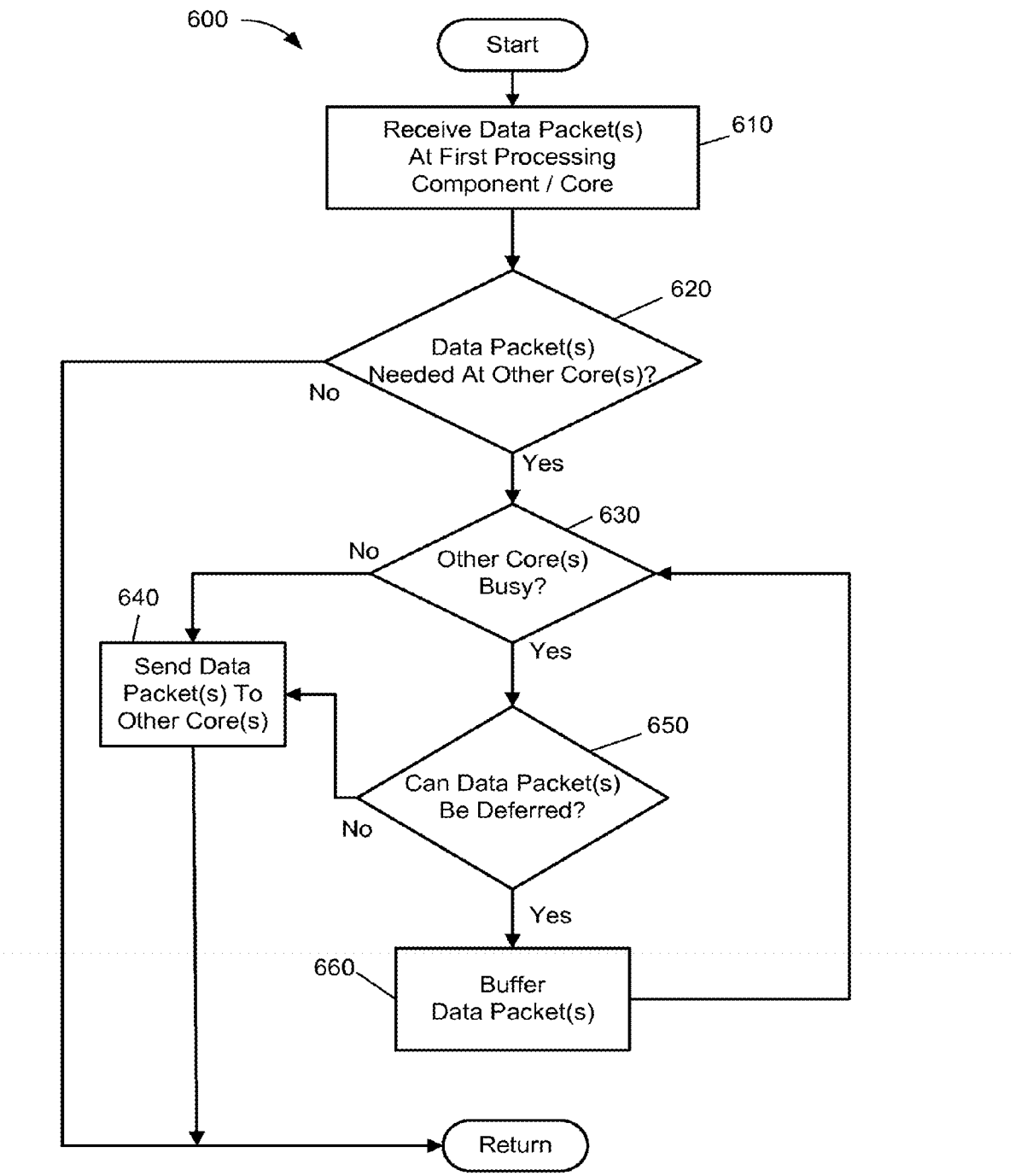
FIG. 6A is a flowchart describing an exemplary embodiment of a method for providing dynamic clock and voltage scaling (DCVS) aware interprocessor communications in a PCD.
Figure 6B:
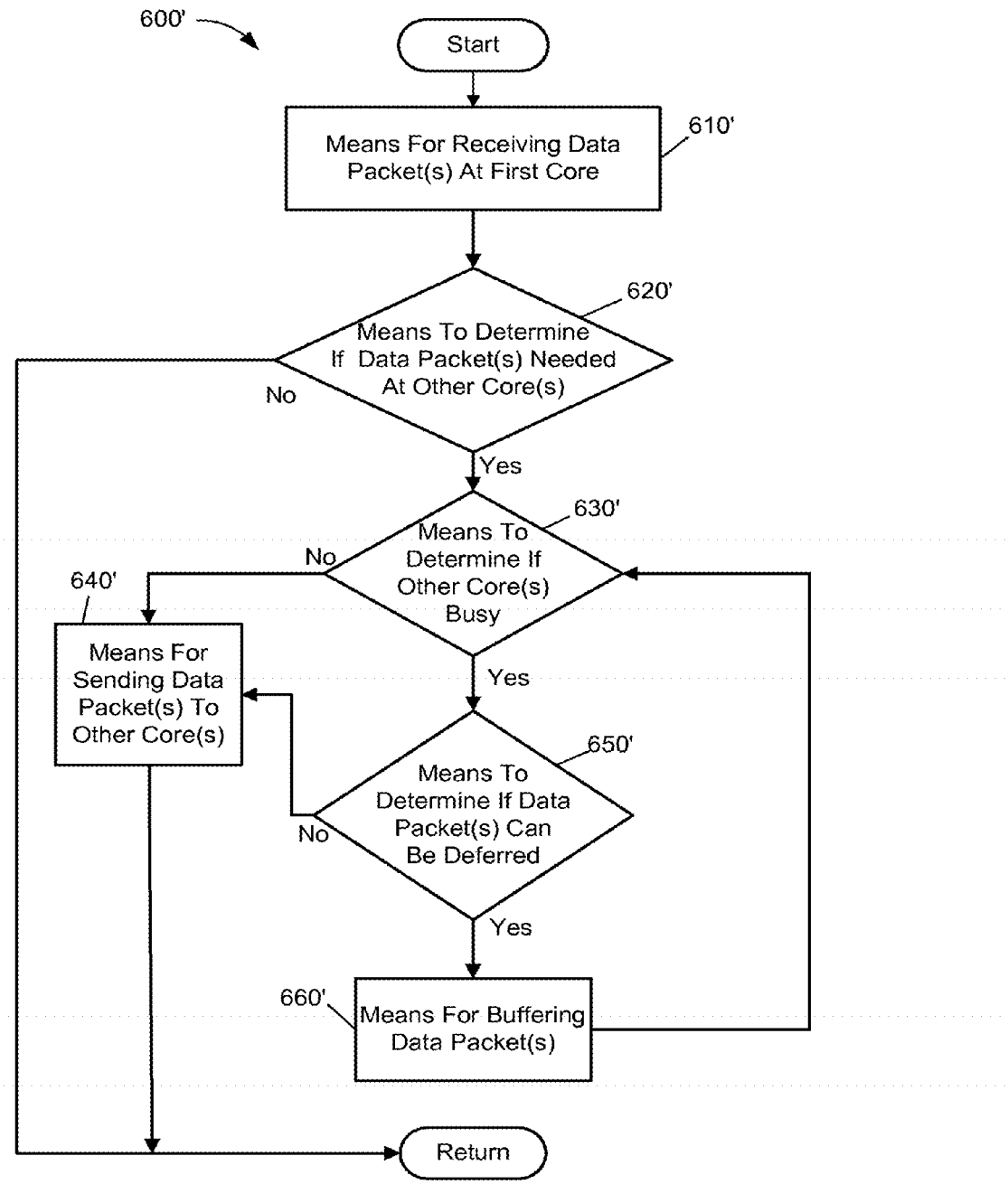
FIG. 6B illustrates example components capable of performing the method illustrated in FIG. 6A.

FIG. 6A is a flowchart describing an exemplary embodiment of a method for providing method for providing dynamic voltage and voltage scaling (DCVS) aware interprocessor communications, such as in processor components used in or with a PCD. The method 600 begins with block 610 where at least one data packet is received at a processing component or core. As discussed above, the processing component may be a core, CPU, DSP, or other processing element within the PCD 100, and the processing component will be referred to in the discussion of the method 600 as a "core" for simplicity. Additionally, the first core may receive a plurality of data packets, with each data packet a part of one or more data streams received by the first core.

At block 620 a determination is made whether one or more data packets may be needed by another processing component or core. For discussion purposes, such other processing components will be referred to in the discussion of method 600 as "other core(s)" or "destination core(s)." As discussed, the determination of whether one or more data packets is needed by other core(s) may be made by the first core, or a component of the first core such as the CPU 412 or packet sending logic 414 of the first core 410 in the exemplary system 400 illustrated in FIG. 4.

In other implementations, the determination of block 620 may be made by an element or component external to the first core, such as a CPU that is external to the first core, or the packet sending logic module 514 of the exemplary system 500 illustrated in FIG. 5. In yet other implementations, block 620 may occur prior to the first core receiving the data packet(s), such as for example another component determining that other core(s) will also need some or all of the data packet(s) and communicating that information to the first core along with the data packets, or prior to or after the first core begins receiving the data packets.

At block 630, a determination is made whether the other core(s) to which the data packet(s) will be sent are "busy."

This determination may be made by the first core or components within the first core, such as by the packet sending logic 414 of the first core 410 in the exemplary system 400 illustrated in FIG. 4. Alternatively, the determination at block 630 may be made by components or elements external to the first core, such as the packet sending logic module 514 of the exemplary system 500 illustrated in FIG. 5. As discussed above for the systems 400 and 500, such a determination at block 630 may be a determination whether immediately sending the data packet(s) would result in an increase in the power consumption at the destination core(s), such as by an increase in the operating frequency of any destination core(s).

The determination at block 630 is based on information received from, or obtained/read from, the destination core(s), such as the active workload of the destination core(s) as discussed above. In the exemplary system of FIG. 5 for example, the packet sending logic module 514 receives information from the counter 526 of the second core 520 and the monitor 536 of the Nth core 530 in order to "read" the active workload of the respective cores 520 and 530 and/or their respective CPUs 522 and 532. The active workload can be read in any manner desired, such as a "busy percentage" of the second core 520/CPU 522 and/or Nth core 530/CPU 522, or as a number busy clock cycles the second core 520/CPU 522 and/or Nth core 530/CPU 532 spent executing non-idle threads in the current sampling period. The evaluations or determinations at block 630 may be made by an algorithm or series of algorithms, or may be made by any other desired means, such as a look-up table.

If the determination at block 630 is that the any destination core is not "busy" the data packet(s) may be immediately sent from the first core to that destination core at block 640, and the method 600 returns. The sending of the data packet(s) to the destination core(s) at block 640 may be accomplished by any method or means desired.

If the determination at block 630 is that the any destination core is "busy" the method 600 at block 650 determines whether the data packet(s) may be deferred. This determination may be based at least in part on various considerations and/or factor, including: the importance of the information contained within the data packet(s); the destination core(s) to which the data is being sent; quality of service ("QoS"); the availability of buffers; the power "cost" of buffering the data; whether the data will time out if not sent to the destination core(s); etc. The preceding are illustrative factors, parameters, or considerations that may be evaluated when making the determination of block 650.

The determination at block 650 may be made by any hardware, software, or firmware component, and in any manner desired, including for example the manner of determining discussed above with respect to the packet sending logic 414 of system 400 illustrated in FIG. 4 and/or the packet sending logic module 514 of system 500 illustrated in FIG. 5. The determination in block 650 may be made by an algorithm or series of algorithms, giving weight to any desired factor, consideration, or optimization outcome; or may be made by any other desired means, such as a look-up table. As would be understood by one of ordinary skill in the art, in some embodiments, block 630 and block 640 may not be separate determinations. Instead, the determinations of whether the destination core is busy (block 630) and whether the packet can be deferred (650) may be made in one determination/step rather than the two separate determinations/steps illustrated in FIG. 6A.

If the determination at block 650 is that the data packet(s) cannot be deferred for any destination core, the data packet(s) may be immediately sent from the first core to that destination core at block 640, and the method 600 returns. Again, the sending of the data packet(s) to the destination core(s) at block 640 may be accomplished by any method or means desired.

If the determination at block 650 is that the sending the data packet(s) to any destination core may be deferred, the data packet(s) for that destination core are buffered in block 660. The buffer may be any type of memory buffer, including for example the buffers 418A and 418B illustrated in FIG. 4 or the buffers 518A and 518B illustrated in FIG. 5. Similarly, the buffer to which the deferred data packet(s) are sent may be a buffer internal to the first core, or may be external to the first core, including external buffers that are shared by the first core and one or more destination core.

After the buffering of the data packet(s) in block 660, the method 600 continues back to block 630 to begin checking whether the destination core(s) to which the buffered data packet(s) are to be sent is still "busy." Thus, the method 600 may check whether one or more destination core(s) are busy multiple times before the conditions warrant that the buffered data packet(s) is sent to the destination core. Such conditions may include, for example a determination a particular destination core is no longer "busy," a determination that the buffered data packet(s) are about to time out such that they must be sent, a determination that the power cost of continuing to buffer outweighs the power cost of sending the data to the destination core(s), etc.

Once the determination is made that the buffered data packet(s) are to be sent to one or more destination core(s), the data packet(s) may be sent to the appropriate destination core(s) at block 640 in any manner desired. For instance, using the system 500 above as an example, the packet sending logic module 514 could cause the data packet(s) to be sent from buffer 418B to the appropriate destination core 520/530 or CPU 522/532. Alternatively, the packet sending logic module 514 could cause the second core 520/CPU 522 and/or Nth core 530/CPU 532 to retrieve the data packet(s) from a shared buffer 418B, such as through a shared memory call to the second core 520/CPU 522 or Nth core 530/CPU 532.

FIG. 6A describes only one exemplary embodiment of a method for providing method for providing voltage scaling (DCVS) aware interprocessor communications, such as in processor components used in or with a PCD. In other embodiments, additional blocks or steps may be added to the method 600. Similarly, in some embodiments various blocks or steps shown in FIG. 6A may be combined or omitted, such as for example combining blocks 630 and 650 into one determining block/step rather than the two separate blocks/steps illustrated in FIG. 6A as discussed above. Such variations of the method 600 are within the scope of this disclosure.

Additionally, certain steps in the processes or process flows described in this specification naturally precede others for the invention to function as described. However, the invention is not limited to the order of the steps described if such order or sequence does not alter the functionality of the invention, such as for example performing block 620 before block 610 as discussed above. Moreover, it is recognized that some steps may performed before, after, or in parallel (substantially simultaneously) with other steps without departing from the scope of the invention. In some instances, certain steps may be omitted or not performed without departing from the invention. Further, words such as "thereafter", "then", "next", "subsequently", etc. are not intended to limit the order of the steps. These words are simply used to guide the reader through the description of the exemplary method.

The various operations and/or methods described above may be performed by various hardware and/or software component(s) and/or module(s), and such component(s) and/or module(s) may provide the means to perform such operations and/or methods. Generally, where there are methods illustrated in Figures having corresponding counterpart means-plus-function Figures, the operation blocks correspond to means-plus-function blocks with similar numbering. For example, blocks 610-660 illustrated in FIG. 6A correspond to means-plus-function blocks 610'-660' illustrated in FIG. 6B.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed processor-enabled processes is explained in more detail in the above description and in conjunction with the drawings, which may illustrate various process flows.

In one or more exemplary aspects as indicated above, the functions described may be implemented in hardware, software, firmware, or any combination thereof. If implemented in software, the functions may be stored on or transmitted as one or more instructions or code on a computer-readable medium, such as a non-transitory processor-readable medium. Computer-readable media include both data storage media and communication media including any medium that facilitates transfer of a program from one location to another.

A storage media may be any available media that may be accessed by a computer or a processor. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of non-transitory computer-readable media.

Although selected aspects have been illustrated and described in detail, it will be understood that various substitutions and alterations may be made herein without departing from the present invention, as defined by the following claims.

What is claimed is:

1. A method for interprocessor communication in a portable computing device (PCD), the method comprising:
   receiving at least one data packet at a first processing component;
   determining that the at least one data packet is needed at a second processing component in communication with the first processing component, the second processing component operating under dynamic clock and voltage scaling (DCVS);
   receiving at the first processing component workload information about the second processing component;
   in response to determining that the at least one data packet is needed at a second processing component in communication with the first processing component, determining whether the second processing component is busy; and
   in response to determining that the second processing component is busy, determining based at least in part on the received workload information whether to delay sending the at least one data packet from the first processing component to the second processing component via an interprocessor communication, wherein determining based at least in part on the received workload information whether to delay sending the at least one data packet from the first processing component to the second processing component or to a buffer is further based at least in part on whether an active workload of the second processing component exceeds a threshold percentage and an operational parameter, wherein the operational parameter comprises at least one of the power consumption of buffering the at least one data packet, a quality of service (QoS) level, and whether the at least one data packet will time out.

2. The method of claim 1, wherein determining based at least in part on the received workload information whether to delay sending the at least one data packet from the first processing component to the second processing component further comprises:
   determining whether sending the at least one data packet to the second processing component would cause the second processing component to increase the operating frequency of the second processing component.

3. The method of claim 1, wherein the determining based at least in part on the received workload information whether to delay sending the at least one data packet from the first processing component to the second processing component is performed by the first processing component.

4. The method of claim 1, further comprising:
   determining that the at least one data packet is needed at a third processing component in communication with the first processing component, the third processing component operating under DCVS;
   receiving at the first processing component workload information about the third processing component; and
   determining based at least in part on the received workload information about the third processing component whether to delay sending the at least one data packet from the first processing component to the third processing component via a second interprocessor communication.

5. The method of claim 1, wherein the portable computing device is battery powered.

6. The method of claim 5, wherein the portable computing device comprises at least one of a mobile telephone, a personal digital assistant, a pager, a smartphone, a navigation device, and a hand-held computer with a wireless connection or link.

7. A system for interprocessor communication in a portable computing device (PCD), the system comprising:
   a first processing core circuit, the first processing component configured to receive at least one data packet;
   a second processing core circuit in communication with the first processing core circuit, the second processing core circuit configured to operate under dynamic clock and voltage scaling (DCVS);
   a buffer in communication with the first processing core circuit and the second processing core circuit;

a counter in communication with the second processing core circuit, the counter configured to obtain workload information about the second processing core circuit, and a packet sending logic in communication with the first processing core circuit and the counter, wherein the packet sending logic is configured determine that the at least one data packet is needed at the second processing core circuit, receive the workload information from the counter, in response to determining that the at least one data packet is needed at a second processing core circuit in communication with the first processing core circuit, determine whether the second processing core circuit is busy, and in response to determining that the second processing core circuit is busy, determine based at least in part on the received workload information whether to delay causing the at least one data packet to be sent from the first processing core circuit to the second processing core circuit via an interprocessor communication determination whether to delay sending the at least one data packet from the first processing core circuit to the second processing core circuit is further based at least in part on whether an active workload of the second processing core circuit exceeds a threshold percentage and an operational parameter, wherein the operational parameter comprises at least one of the power consumption of buffering the at least one data packet, a quality of service (QoS) level, and whether the at least one data packet will time out.

8. The system of claim 7, wherein:
the second processing core circuit further comprises a DCVS module configured to provide dynamic clock and voltage scaling for the second processing core circuit, and
the counter is part of the DCVS module.

9. The system of claim 7, wherein the packet sending logic is part of the first processing core circuit.

10. The system of claim 7, wherein the buffer is external to the first processing core circuit.

11. The system of claim 7, wherein the portable computing device is battery powered.

12. The system of claim 11, wherein the portable computing device comprises at least one of a mobile telephone, a personal digital assistant, a pager, a smartphone, a navigation device, and a hand-held computer with a wireless connection or link.

13. The system of claim 7, further comprising:
a third processing core circuit in communication with the first processing core circuit and the buffer, the third processing core circuit configured to operate under dynamic clock and voltage scaling (DCVS); and
a monitor in communication with the third processing core circuit and the packet sending logic, the monitor configured to obtain workload information about the third processing core circuit,
wherein the packet sending logic is configured to receive the workload information about the third processing core circuit from the monitor and determine based at least in part on the received workload information and a second operational parameter whether to delay causing the at least one data packet to be sent from the first processing circuit to the third processing core circuit via a second interprocessor communication.

14. The system of claim 13, wherein the packet sending logic comprises a packet sending module external to the first processing core circuit.

15. A computer program product comprising a non-transitory computer usable medium having a computer readable program code embodied therein, said computer readable program code adapted to be executed to implement a method for interprocessor communication in a portable computing device (PCD), the method comprising:
receiving at least one data packet at a first processing component;
determining that the at least one data packet is needed at a second processing component in communication with the first processing component, the second processing component operating under dynamic clock and voltage scaling (DCVS);
receiving at the first processing component workload information about the second processing component;
in response to determining that the at least one data packet is needed at a second processing component in communication with the first processing component, determining whether the second processing component is busy; and
in response to determining that the second processing component is busy, determining based at least in part on the received workload information whether to delay sending the at least one data packet from the first processing component to the second processing component via an interprocessor communication, wherein determining whether to delay sending the at least one data packet from the first processing component to the second processing component is further based at least in part on whether an active workload of the second processing core circuit exceeds a threshold percentage and an operational parameter, wherein the operational parameter comprises at least one of the power consumption of buffering the at least one data packet, a quality of service (QoS) level, and whether the at least one data packet will time out.

16. The computer program product of claim 15, wherein determining based at least in part on the received workload information whether to delay sending the at least one data packet from the first processing component to the second processing component further comprises:
determining whether sending the at least one data packet to the second processing component would cause the DCVS of the second processing component to increase the operating frequency of the second processing component.

17. The computer program product of claim 15, wherein the determining based at least in part on the received workload information is performed by a packet sending logic module of the first processing component.

18. The computer program product of claim 15, further comprising:
determining that the at least one data packet is needed at a third processing component in communication with the first processing component, the third processing component operating under DCVS;
receiving at the first processing component workload information about the third processing component; and
determining based at least in part on the received workload information about the third processing component whether to delay sending the at least one data packet from the first processing component to the third processing component via a second interprocessor communication.

19. The computer program product of claim 15, wherein the portable computing device is battery powered.

20. The computer program product of claim 19, wherein the portable computing device comprises at least one of a mobile telephone, a personal digital assistant, a pager, a smartphone, a navigation device, and a hand-held computer with a wireless connection or link.

21. A system for interprocessor communication in a portable computing device (PCD), the system comprising:
means for receiving at least one data packet at a first processing component;
means for determining that the at least one data packet is needed at a second processing component in communication with the first processing component, the second processing component operating under dynamic clock and voltage scaling (DCVS);
means for receiving at the first processing component workload information about the second processing component;
means for, in response to determining that the at least one data packet is needed at a second processing component in communication with the first processing component, determining whether the second processing component is busy;
means for, in response to determining that the second processing component is busy, determining based at least in part on the received workload information whether to delay sending the at least one data packet from the first processing component to the second processing component; and
means for determining whether to delay sending the at least one data packet from the first processing component to the second processing component via an interprocessor communication-based at least in part on whether an active workload of the second processing core circuit exceeds a threshold percentage and an operational parameter, wherein the operational parameter comprises at least one of the power consumption of buffering the at least one data packet, a quality of service (QoS) level, and whether the at least one data packet will time out.

22. The system of claim 21, wherein the means for determining based at least in part on the received workload information whether to delay sending the at least one data packet from the first processing component to the second processing component further comprises:
means for determining whether sending the at least one data packet to the second processing component would cause the DCVS of the second processing component to increase the operating frequency of the second processing component.

23. The system of claim 21, wherein the means for determining based at least in part on the received workload information is a part of the first processing component.

24. The system of claim 21, further comprising:
means for determining that the at least one data packet is needed at a third processing component in communication with the first processing component, the third processing component operating under DCVS;
means for receiving at the first processing component workload information about the third processing component; and
means for determining based at least in part on the received workload information about the third processing component whether to delay sending the at least one data packet from the first processing component to the third processing component via a second interprocessor communication.

25. The computer program product of claim 21, wherein the portable computing device is battery powered.

26. The computer program product of claim 25, wherein the portable computing device comprises at least one of a mobile telephone, a personal digital assistant, a pager, a smartphone, a navigation device, and a hand-held computer with a wireless connection or link.

* * * * *